Figure 1:
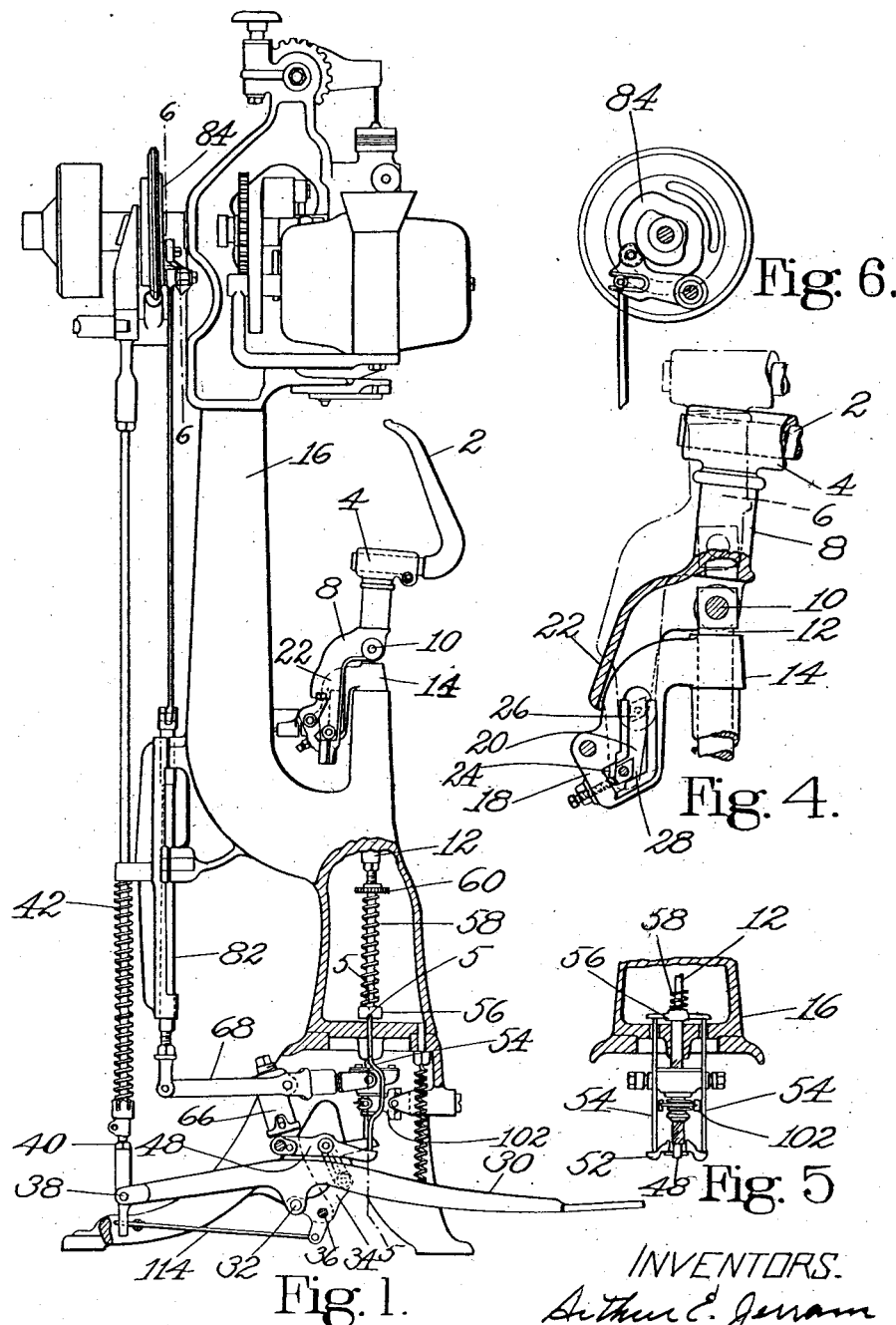

UNITED STATES PATENT OFFICE.

ARTHUR ERNEST JERRAM, ARTHUR BATES, AND JOSEPH GOULDBOURN, OF LEICESTER, ENGLAND, ASSIGNORS TO UNITED SHOE MACHINERY COMPANY, OF PATERSON, NEW JERSEY, A CORPORATION OF NEW JERSEY.

WORK-SUPPORT.

1,118,015.  Specification of Letters Patent.  Patented Nov. 24, 1914.

Application filed August 24, 1908. Serial No. 450,092.

*To all whom it may concern:*

Be it known that we, ARTHUR E. JERRAM, ARTHUR BATES, and JOSEPH GOULDBOURN, subjects of the King of England, residing at Leicester, in the county of Leicester, England, have invented certain Improvements in Work-Supports, of which the following description, in connection with the accompanying drawings, is a specification, like reference characters on the drawings indicating like parts in the several figures.

This invention relates to work supports and particularly to work supports such as are commonly used in machines employed in the manufacture of boots and shoes to support the work during the various operations performed by said machines. The work support herein illustrated is of the type commonly employed with machines for inserting fastenings and operates to clamp the work against a work abutment adjacent to, or surrounding, the point at which the operation upon the work is performed, the invention being especially applicable to work supports of this type.

To permit the removal of the work from a work support of the type just described, provision is usually made for relative movement of rise and fall between the said support and the head of the machine, and mechanism is usually provided also for effecting such relative movement of rise and fall. When a work support is employed which is arranged to be inserted into the boot or shoe to support it from the inside, it is necessary to provide a considerable relative movement between the head and the work support in order to permit easy removal of the work from or replacement of work upon said support.

The present invention has for its purpose to simplify the construction and operation of the mechanism by which the work support is moved in relation to the operative parts of the machine and to enable the work to be placed upon the work support in an easier manner and consequently more expeditiously than has hitherto been possible. To this end the invention comprises the combination in a machine for use in the manufacture of boots and shoes of a work support between which and the head of the machine there is a relative movement of rise and fall and a mechanism that effects at proper times during the movement of the work support a canting of said support, preferably in toward the machine or out toward the operator. Preferably also, said mechanism is so constructed that not only does it cant the work support but it also constrains it from such canting during part of the rising and falling movement.

The invention comprises further the combination in a machine for use in the manufacture of boots and shoes of a work support and manually operated means which effects first a raising of the work support to cause it to exert upon the work a light yielding pressure and then continues the movement to cause it to exert a heavier pressure, preferably of uniform and pre-determined amount for successive operations. Preferably, this combination includes also connections between the said means and a starting device whereby the machine is started after the heavy pressure has been applied.

The invention comprises further a construction in which the means for bringing to bear upon the work through the work support a light yielding pressure is combined with a locking device and yielding devices of varying strength in such manner that the said means applies a thrust to the work support through one of the yielding devices, then engages the locking device with the work support and finally imparts through another yielding device and the locking device a heavier thrust to said work support. In this combination the means for applying the varying pressures and operating the locking device can conveniently be operated by a treadle or otherwise, for example, by connections with a moving part of the machine. Preferably, the same treadle is utilized to operate also the mechanism that effects the canting of the work support during its rising and falling movement, although it will be obvious that this mechanism might conveniently be operated from a moving part of the machine.

An important feature of the invention consists in the employment in combination with means for bringing to bear upon the work and work support varying pressures in predetermined succession, of a toggle or like device which not only effects an operation of said means but assumes a position in which it can prevent the transmission of back pressure to the treadle or other mechanism through which operating force is transmitted to said means.

The invention comprises further the combination with the locking device hereinbefore referred to which is employed for the purpose of transmitting the final thrust, of means for operating the locking device in the reverse direction thereby to draw down the work support thus released.

Other features of the invention are the provision in a machine of the class described of work support operating mechanism comprising means for applying to the work through the work support first a light yielding pressure and then a clamping pressure, preferably yielding also, and a locking device through which the second pressure is applied to the work, said device with its associated parts constituting a work-thickness compensating mechanism, the provision of means for effecting a raising of the work support into work clamping position and then an actuation of the clutch for starting the machine, in combination with means for positively preventing the actuation of the clutch until after the work support has been raised into proper clamping position, the provision of a construction like that hereinbefore described in which first a light yielding pressure is brought to bear upon the work through the work support and then a heavy yielding pressure, in combination with means for depressing the work support so constructed and arranged that the heavy pressure is first removed from the work and then the work support depressed against the light pressure for each work feeding operation, and the provision of a construction in which a rotatable work support may be canted laterally to bring it into position for convenient removal or replacement of the work at any point in its path of rotation.

With the foregoing objects in view together with other objects apparent from a consideration of the construction and operation of the machine hereinafter described, the invention is herein shown as embodied in a machine for operating upon boots and shoes commonly referred to as a "loose nailing machine," the illustrated machine being substantially that disclosed in United States Letters Patent to George Goddu, No. 898,573, granted September 15, 1908, for improvements in machines for driving loose nails to which patent reference may be had for a more detailed description of parts herein shown or referred to but not specifically described.

Figure 2:
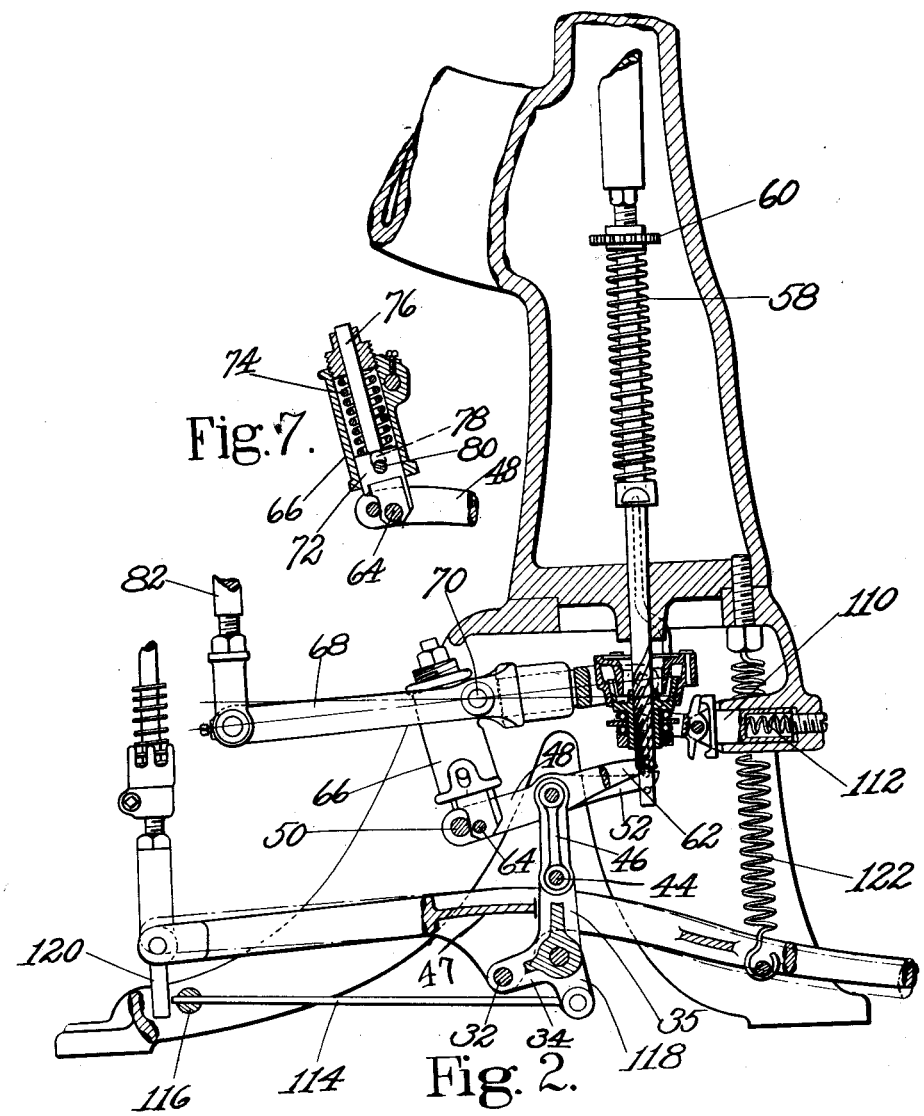
Figure 3:
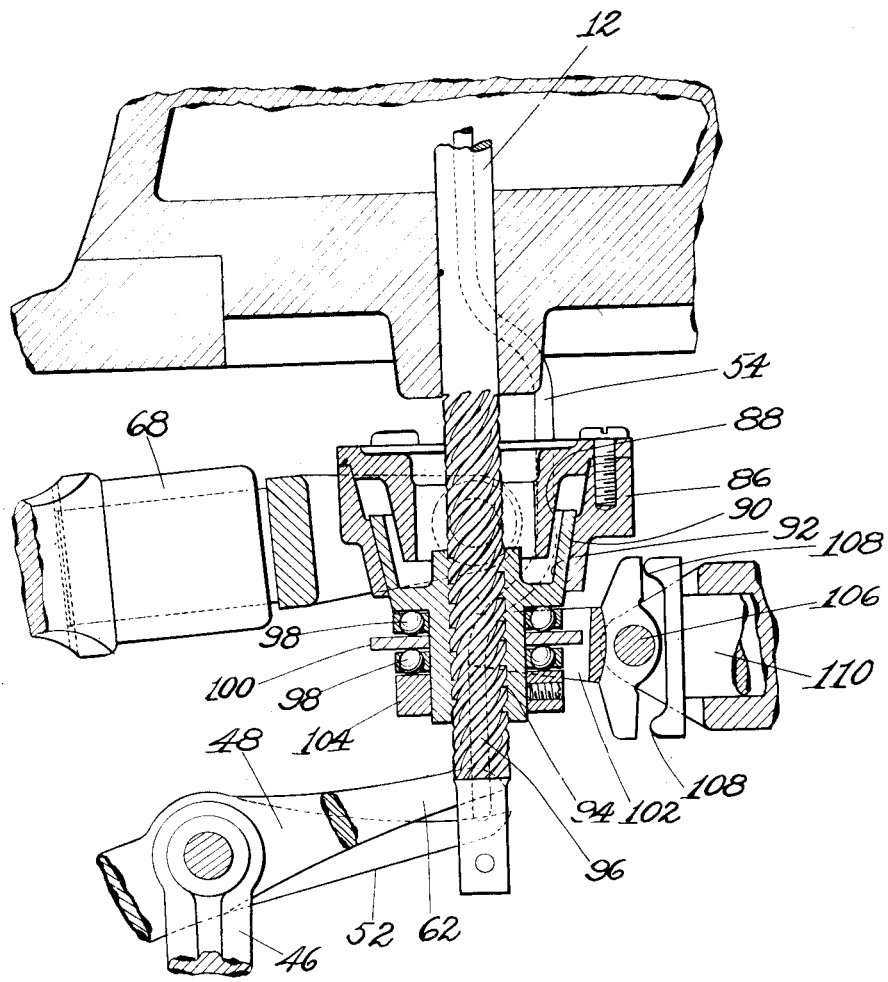

In the accompanying drawings:—Figure 1 represents in side elevation a nailing machine of the type disclosed in the above identified application, having embodied therein the features of the present invention; Fig. 2 is a vertical section of the base portion of the machine shown in Fig. 1 drawn to a larger scale than in that figure; Fig. 3 is a section similar to that shown in Fig. 2 and drawn to a still larger scale in order to illustrate more clearly the locking device forming the part of the present invention; Fig. 4 is a side elevation showing in detail the mechanism for effecting the canting of the work support or horn; Fig. 5 is a section on the line 5—5 in Fig. 1; Fig. 6 is a section on the line 6—6 in Fig. 1 showing especially a cam upon the main shaft by which the horn is depressed before the work feeding operation; Fig. 7 is a detail sectional view of a spring box forming an element of the mechanism for effecting a clamping of the work by the work support.

The work support 2, which in the present construction is constituted by a horn, is clamped in a holder 4 which is pivoted at 6 to turn on an approximately vertical axis in the upper part of a rocker member 8 that in turn is pivoted at 10 to a vertically movable horn carrying post 12 in such a manner as to turn upon a horizontal axis. The vertically movable post 12 is guided by bearings, one of which may conveniently be formed of a sleeve 14 secured to the main frame 16 of the machine and provided with a downward extension 18 in which is formed a cam slot 20 of a form hereinafter more fully described.

The rocker 8 to which the horn carrying holder 4 is pivoted, is provided also with a downward extension 22 carrying at its lower extremity a square or approximately square die block 24 which engages with the cam slot 20. The cam slot 20 is of right angled or approximately right angled formation or elbowed, said slot having a vertical part 26 that is parallel with the axis of the vertically movable post 12. Joining the vertical part 26 of the cam slot 20 is a horizontal or approximately horizontal part 28 which extends away from the axis of the post 12. In this construction as the sliding post 12 is moved downwardly from its raised position, that is, from the position in which it supports the work for the operation to be performed upon it by the machine, the die block 24 will slide in the vertical part 26 of the cam slot and thus maintain the rocker member 8 in an unchanged position with relation to the post 12, the horn 2 being at this time erect. When, however, the post 12 is lowered sufficiently, the die block 24 will enter the horizontal or approximately horizontal part 28 of the slot and the further downward movement of the post 12 will cause the die block 24 to travel along the said horizontal part 28 of the slot, thus causing the rocker member 8 to be turned upon the pivot 10. As the holder 4 carrying the horn 2 is mounted upon the rocker member 8, the turning of the latter about its pivot 10 will cant the horn in a direction toward the operator so that the horn tip will be clear of the operative parts of the machine whereby the work can be removed from the horn or new stock placed thereon with great facility.

It will be obvious that the invention is not limited to a construction in which the cam slot is formed in a part rigidly attached to the frame of the machine and in which the die block is carried by the rocker member and that as an alternative arrangement, the cam slot could be arranged in the rocker arm or member while the die block could be fixed to the sleeve 14 secured to the frame, and the cam slot being properly shaped and arranged to produce the cant of the horn in the direction hereinbefore described.

The vertically movable post 12 is reciprocated by mechanism now to be described comprising means for compensating for varying thicknesses in the work, said mechanism being preferably operated by a treadle which is so arranged that the first movement of depression of the said treadle lifts the post 12 yieldingly so that the horn 2 is first raised from its canted position into its upright position, and is then raised into contact with the work. Further depression of the treadle after the horn has been raised into contact with the work, compresses a strong spring hereinafter more particularly described, that applies an upward thrust to the work upon the horn and in the illustrated preferred construction effects a clamping of the work between the horn and a work abutment. The completion of the depression of the treadle operates a rod by which a clutch mechanism is controlled and whereby the starting of the machine is effected.

The preferred construction for performing the operations just described in the order described comprises a treadle lever 30 pivotally connected at 32 to an arm of a bell-crank lever 34 pivoted at 36 upon the frame 16. The end of the treadle lever 30 remote from the part engaged by the foot of the operator is connected at 38 to a rod 40 that requires lifting to effect the operation of the clutch which throws in the driving gear and starts the machine. The clutch rod 40 is maintained in its lowermost position by a spring 42 which is of sufficient strength to hold the rod 40 down so that it will afford a pivot for the treadle until the bell-crank lever 34 has been turned to bring its connection 32 with the treadle into its lowermost position. Thereafter the connection 32 of the treadle lever 30 will form the fulcrum of the rear end of the treadle lever 30 which will be raised in opposition to the spring 42, thereby operating the clutch mechanism by which the machine is started. Before, however, the treadle 30 has been lowered far enough to cause the machine to be started, other mechanism now to be described will have been operated, first to raise the horn and then to press the horn against the work to effect a clamping thereof against the work abutment. This mechanism comprises preferably a second arm 35 formed upon the bell-crank lever 34 and connected at 44 to one end of a link 46 which, at its other end is pivoted to another lever 48 fulcrumed at 50 upon the frame 16. The forward end of the lever 48 is provided with a saddle-piece 52 in which are received the ends of thrust rods 54 (see particularly Fig. 5) which bear at their upper ends against a sliding cross-piece 56. The cross-piece 56 surrounds loosely the vertically movable post 12 and forms a support for a spring 58 which also surrounds the said post and bears at its upper end against an adjustable collar 60 screwed upon said post. The second arm of the bell-crank lever 34 and the link 46 together form a toggle which, when straightened by the preliminary depression of the treadle 30, turns the lever 48 upon its fulcrum 50 and through the thrust rods 54 sliding cross-piece 56 and spring 58 lifts the post 12, thus raising the canted horn into a vertical position and causing it to be pressed yieldingly against the work. The lever 48 is also provided with an extension 62 which engages with a pin passed through the vertical post 12, whereby, when the toggle is broken, the turning movement of the lever 48 will move the post 12 downward for a purpose hereinafter set forth.

During the final part of the straightening movement of the toggle, an additional heavy spring pressure is applied to the horn whereby, as hereinbefore suggested, it is caused to clamp the work firmly against a fixed abutment during the operation of the machine. To effect this the lever 48 is provided with a pivot 64 to which a spring device (see Fig. 7) is connected, said spring device being also connected to a floating lever 68. The spring device comprises a spring box or container 66 which is pivoted to the lever 68 at 70 and which contains a piston 72 that is pivoted to the lever 48 at 64. A strong spring 74 is interposed between the piston 72 and the end of the spring box 66, this spring tending to maintain the piston in its outermost position. The end of the spring box against which the spring 74 bears may be adjustable to vary the compression of the spring and the said end may be provided with an aperture through which an extension 76 of the piston passes, thereby to maintain the said piston in proper alinement. A slot 78 in the spring box casing 66 and a pin 80 in the piston 72 may also be provided to limit the movement of the piston 72 in the box 66. The lever 68 is forked at the end adjacent to the vertically movable post 12 and at this forked end it embraces a locking device hereinafter more fully described.

The rear end of the floating lever 68, instead of being mounted upon a fixed point is connected, for a purpose hereinafter set forth, with a slider 82 actuated by a cam 84 upon the main shaft of the machine. The locking device to which the floating lever 68 is connected at its front end, comprises a cylindrical construction 86 (see particularly Fig. 3) which surrounds the vertically movable post 12 and which is provided with two conical surfaces, one of which surfaces 88 faces outwardly from the post 12 while the other surface 90 is opposed to the first surface and is arranged parallel to it. A space is left between the two conical surfaces 88 and 90 into which an extension 92 upon a threaded nut 94 projects, said extension being so shaped that it is adapted to engage with either of the surfaces 88 or 90. The nut 94 runs upon a steeply threaded part 96 of the vertically movable post 12 and is free to rotate thereon during the upward movement of the post 12 when the latter is moving upwardly through the preliminary operation of the lever 48. This movement, as hereinabove set forth, is transmitted to the post 12 through the saddle-piece 52, thrust rods 54 and spring 58. The threaded nut is supported by ball bearings 98, one set of which is located between the extension 92 of the nut 94 and a thrust collar 100 pivotally carried by a lever 102 mounted upon the machine frame. The other set of ball bearings is located between the thrust collar 100 and a collar 104 secured upon the threaded nut 94. The lever 102 is fulcrumed at 106 upon the machine frame and is maintained yieldingly in a middle position by an abutment 108 at the end of a plunger 110 mounted in a recess in the machine frame and pressed outwardly by a spring 112. The operation of the mechanism thus far described is as follows:

When the vertical post 12 is lifted by the spring 58 to bring the horn 2 into contact with the work, the steep screw thread 96 on the post 12 will cause the nut 94 to turn idly upon the thrust collar under it. When, however, the floating lever 68 has been turned on its connection with the slider 82 by the continued straightening of the toggle 34, 46, the conical surface 90 will engage the corresponding surface of the extension 92 of the nut 94. The nut 94 will thus be frictionally locked to the post 12 in the further upward movement of the lever 68 and cause the spring 74 in the spring box 66 to exert a strong upward pressure upon the horn 2, this pressure continuing during the subsequent further depression of the treadle 30 by which the clutch actuating rod 40 is raised to effect the starting of the machine. The provision of the spring pressed plunger 110 carrying the abutments 108 which normally maintain the lever 102 carrying the thrust collar 100 in its middle position, insures that either of the conical surfaces 88, 90, shall be held yieldingly in contact with the extension 94 when the locking device is moved upwardly or downwardly.

To prevent any possibility of the machine being started before the lifting of the horn has been completed, a locking device is preferably provided. This device comprises a rod 114 which is guided in a bearing 116 and is connected at one of its ends with an arm 118 formed on the toggle member 34. The other end of the rod 114 projects, while the toggle is in its "broken" position, into a slot or recess in the lower end 120 of the clutch operating rod 40 and thereby prevents the latter from rising until the toggle has been straightened and the horn raised and pressed against the work.

In the class of machines in which work supports of the type of that herein disclosed are used, it is usually preferable to provide means for depressing the work supports slightly between successive operations of the machine in order to permit the work to be fed freely thereover. For this purpose in the present construction, the slider 82 actuated by the cam 84 is employed as aforesaid as the fulcrum upon which the floating lever 68 turns during the work pressing movement of the horn. When the slider 82 is raised by its cam 84 for the purpose of depressing the horn to permit a ready feed of the work, the floating lever 68 will swing upon the pivot 70 where it is connected with the spring box 66 which then forms its fulcrum. This will result in the forward end of the lever 68 being depressed whereby the conical surface 88 of the locking device will be brought into contact with the corresponding surface of the extension 92 of the nut 94 thereby locking the same upon the post 12 and carrying the latter downward a sufficient distance to enable the work to be fed by any suitable or usual work feeding means for example that disclosed in the Patent No. 898,573 hereinabove referred to. When the feed has been effected the slider 82 is again depressed and the fork at the front end of the lever 68 will be raised to bring the conical part 90 again into contact with the extension 92 and thus re-apply the pressure to the work, the spring 74 being again compressed.

The operation of the mechanism has been indicated in the foregoing description of the various parts thereof and it will readily be seen that in the reverse action of the mechanism the sequence of the different stages of the operation will be the reverse of that already described; that is to say, when the treadle lever 30 is lifted by any suitable means, such for example as the spring 122, as it is released by the operator, the machine will first be stopped, the heavy pressure will then be removed from the horn, and finally the horn will be lowered by the action of the extension 62 of the lever 48 upon the pin in the vertical post 12 and the horn will be canted into position for the convenient removal of the work and the placing of new work upon it.

By the employment of the toggle 34, 46 between the treadle 30 and the pressure applying mechanism, a comparatively light pressure only will be required to compress the heavy spring 74 in the spring box 66 while the toggle 34, 46, will prevent any back pressure from being transmitted to the operator or to the clutch operating devices from the mechanism for operating the horn. Moreover, by the arrangement hereinbefore described, the pressure applied to the work can be very much greater than in machines having the older type of horns and it will be independent of the thickness of the work being operated upon. In the older type in which the horn is held up by a spring and depressed against the said spring by a treadle to enable the work to be removed or replaced, it has been necessary to move the horn through a considerable distance in order to give the required clearance for the work. This range of movement has had the effect to limit materially the amount of pressure that could be applied to the work by the operation of the treadle. According to this invention and as hereinbefore described, the pressure is applied through the locking device, which, with its associated parts, comprises a work thickness compensating means, after the horn has been brought into contact with the work, whereby greater pressure can be applied to the work than has hitherto been possible and whereby the pressure upon the work during successive operations can be maintained more uniform than has hitherto been possible.

It will be noted that the bell crank lever 34 moves in a slot in the treadle lever 30 and that a stop 47 formed on said lever and located in said slot limits the straightening movement of the toggle.

Having described our invention, what we claim as new and desire to secure by Letters Patent of the United States is:—

1. In a machine of the class described, a normally lowered horn, a vertically movable horn raising rod to the upper end of which said horn is pivotally connected, means for raising and lowering said rod to raise the horn into operative work supporting position and to lower it into work receiving position respectively, and a single means operating positively and automatically during the raising and lowering of the horn to cant the horn about its pivotal connections, in toward the machine as it is raised and out toward the operator as it is lowered.

2. In a machine of the class described, a normally lowered horn, a vertically movable horn raising rod to which said horn is pivotally and rotatably connected at its lower end, means for raising and lowering said horn to effect the movements of the horn between its operative work supporting position and its work receiving position, and a single means coöperating with said horn during its rising and falling movements and operating positively to cant said horn about its pivotal connections in toward the machine as it is raised and out toward the operator as it is lowered.

3. In a machine of the class described, a horn, a horn-raising rod, a rocker member carried by said rod and on which said horn is rotatably mounted, means for operating said horn-raising rod and means for rocking said rocker member upon said horn raising rod during the movement of said rod to cant the horn in toward the machine as it is raised and out toward the operator as it is lowered.

4. In a machine of the class described, a horn, a horn-raising rod, a rocker member pivotally connected to the upper end of said horn-raising rod and in which said horn is rotatably mounted; and a block and slot connection between said rocker member and the machine frame, said slot being so shaped as to cause a canting of said horn upon said rod as it is moved from operative to inoperative position.

5. In a machine of the class described, a vertically movable work support, and treadle operated means for raising said support into work clamping position comprising means for first applying a light yielding pressure to the work through said work support and means for afterward applying to the work through said work support a heavy yielding pressure.

6. In a machine of the class described, a vertically movable work support, means for applying to the work through said work support, a light yielding pressure, means comprising a floating lever for applying to the work through said work support a heavy yielding pressure, and means coöperating with one end of said floating lever and set by the means for applying the light yielding pressure for causing the heavy yielding pressure to be of uniform amount for successive operations and independent of the thickness of the work clamped.

7. In a machine of the class described, a vertically movable work support, means for effecting a movement of the said support into work clamping position, comprising a treadle, means operated through said treadle for bringing to bear upon the work through said support the pressure of a strong spring, and work thickness compensating means through which said pressure is applied to the work support adjusted by the initial movement of the treadle.

8. In a machine of the class described, a work support movable relatively to the head of the machine between a work receiving position and an operative work supporting position, and means for effecting such relative movement comprising means for first bringing said work support into its operative work supporting position, means for locking said support in such position, means operating through said locking means to apply a yielding work clamping pressure to said support and a treadle constructed and arranged to operate the said means in proper order.

9. In a machine of the class described, a vertically movable work support, a plurality of yielding devices of varying strength, means for bringing to bear upon the work support through one of said yielding devices an initial clamping pressure, means for locking said support in the position to which it has been moved by said yielding device, means for bringing to bear upon said work support through another of said yielding devices, a heavier clamping pressure of pre-determined amount and a treadle through which said means are operated in proper succession.

10. In a machine of the class described, a vertically movable work support and means for effecting the vertical movements of said support, including means for compensating for varying thicknesses of the work carried upon said support, said last named means comprising a nut threaded on said support and yieldingly held in a mid position, means for moving said nut, means for locking said nut against rotation in order to effect the upward movement of said support and means for locking said nut against rotation in order to effect a downward movement of said support.

11. In a machine of the class described, a vertically movable work support and means for effecting the vertical movements of said support, including means for compensating for varying thicknesses of the work carried upon said support, said last named means comprising a nut threaded upon said support and yieldingly held in a mid-position, means for moving said nut, means for frictionally locking said nut against rotation in order to effect an upward movement of said support and means for frictionally locking said nut against rotation in order to effect a downward movement of said support.

12. In a machine of the class described, a horn, a horn-raising rod, and means for applying clamping pressure at different points upon said horn raising rod in accordance with the thickness of the work to be clamped by said horn, comprising a nut threaded upon said rod and having a conical flange, a member having opposed conical surfaces arranged upon opposite sides of said flange, one of said surfaces being arranged to engage on side of said flange upon the downward movement of said member and the other being arranged to engage the other side of said flange upon the upward movement of said member and means for effecting upward and downward movements of said member.

13. In a machine of the class described, a horn, a horn-raising rod, and means for applying clamping pressure at different points upon said horn-raising rod in accordance with the thickness of the work to be clamped by said horn, comprising a nut threaded upon said rod and having a conical flange, a member having opposed conical surfaces arranged upon opposite sides of said flange, one of said surfaces being arranged to engage one side of said flange upon the downward movement of said member and the other being arranged to engage the other side of said flange upon the upward movement of said member, and means for effecting upward and downward movements of said member of pre-determined amounts.

14. In a machine of the class described, a vertically movable work support, a floating lever, means for connecting said lever to said work support to effect vertical movements thereof, and means for yieldingly imparting movement to said lever to bring yielding pressure to bear upon the work comprising a spring carried by said lever.

15. In a machine of the class described, a vertically movable work support, a toggle, a lever connected to one end of said toggle, means for applying light yielding pressure to said work support connected to said lever, a floating lever, a work thickness compensating connection between said floating lever and said work support, a yielding connection between said first mentioned lever and said floating lever comprising a strong spring, and means for straightening said toggle.

16. In a machine of the class described, a vertically movable work support, and treadle operated means constructed to effect the movements of said support between its work receiving and its operative work supporting positions, comprising means for canting said support in toward the machine during its rising movement and out toward the operator during its falling movement, means for applying to the work through said support the clamping pressure of a strong spring and a toggle arranged to lock said spring in its work clamping relation to the work support and to prevent the transmission of back pressure to the means through which the work support has been moved.

17. In a machine of the class described provided with mechanism for operating upon the work, a work support, means for starting said mechanism, means for raising said work support into work supporting position. a treadle lever for operating said last named two means, and a fulcrum for said lever upon each of said means about which it turns when operating upon the other.

18. In a machine of the class described, a vertically movable work support, a treadle, means for effecting movement of said work support into work clamping position and means for setting the machine in operation, said treadle being arranged to operate first as a lever of one class when actuating said first-named means, and then as a lever of another class when actuating said last-named means.

19. In a machine of the class described, a vertically movable work support, a treadle, means for effecting a movement of said work support into work clamping position and means for setting the machine in operation, said treadle being arranged to operate first as a lever of the second class when actuating said first named means, and then as a lever of the first class when actuating said last named means.

20. In a machine of the class described, a vertically movable work support, a toggle, means operated by the straightening of said toggle for effecting a movement of said work support into work clamping position, a treadle lever pivoted intermediate its ends upon an arm formed upon one of the toggle members and pivotally connected at one end to clutch actuating means, and means for preventing said treadle from operating said clutch actuating means until it has straightened said toggle.

21. In a machine of the class described, a vertically movable work support and means for effecting vertical movements of said support, comprising a toggle, a treadle connected to said toggle for straightening and breaking it and means carried by said treadle with which a member of the toggle engages to limit the straightening movement of said toggle.

22. In a machine of the class described, a vertically movable work support, means for applying to said work support a light yielding pressure, means for depressing said work support against said light yielding pressure between the successive operations of the machine to permit the feeding of the work and means constructed to automatically depress said support a greater distance against said light yielding pressure after the machine has ceased to operate to permit the convenient removal of the work, said last mentioned means operating independently of the source of power from which the machine is operated.

23. In a machine of the class described, a vertically movable work support, means for applying to the work through said work support the pressure of a strong spring, and means, comprising work thickness compensating means, for intermittently depressing said work support to permit the work to be fed constructed to permit said spring to expand until the pressure is removed from the work before the depressing operation begins.

24. In a machine of the class described, a vertically movable work support, means for applying to the work through said work support the pressure of a strong spring, and means, comprising work thickness compensating means, for positively depressing said work support between the operations of the machine upon the work, to permit the work to be fed, constructed to permit said spring to expand until the pressure is removed from the work before the depressing operation begins.

25. In a machine of the class described, a vertically movable work support, means for applying to the work through said work support the pressure of a strong spring, means for limiting the expansion of said spring, and means comprising work thickness compensating means for intermittently depressing said work support to permit the work to be fed constructed to permit said spring to expand to its limit before the depressing operation begins.

26. In a machine of the class described, a vertically movable work support, a spring, a spring container constructed to limit the amount of expansion of said spring, connections between said container and said work support, means for compressing the spring in said container to cause yielding pressure to be applied to the work through the work support and means, comprising work thickness compensating means, for intermittently depressing said work support, to permit the work to be fed, constructed to permit said spring to expand to its limit in said container before the depressing operation begins.

In testimony whereof we have signed our names to this specification in the presence of two subscribing witnesses.
ARTHUR ERNEST JERRAM.
ARTHUR BATES.
JOSEPH GOULDBOURN.

Witnesses:
GRACE HOLMES,
AMY ILLINGWORTH.